US012540596B2

(12) United States Patent
Arango et al.

(10) Patent No.: US 12,540,596 B2
(45) Date of Patent: Feb. 3, 2026

(54) BUOYANCY CONTROL OF TURBOMACHINERY

(71) Applicant: BLADERUNNER ENERGY INC., Bend, OR (US)

(72) Inventors: Moriel Alberto Arango, Bend, OR (US); Brian Patrick Gilbane, Bend, OR (US)

(73) Assignee: BLADERUNNER ENERGY INC., Bend, OR (US)

( * ) Notice: Subject to any disclaimer, the term of this patent is extended or adjusted under 35 U.S.C. 154(b) by 0 days.

(21) Appl. No.: 18/977,269

(22) Filed: Dec. 11, 2024

(65) Prior Publication Data

US 2025/0264084 A1   Aug. 21, 2025

Related U.S. Application Data

(60) Provisional application No. 63/556,142, filed on Feb. 21, 2024.

(51) Int. Cl.
| *F03B 17/06* | (2006.01) |
| *F03B 3/12* | (2006.01) |
| *F03B 13/00* | (2006.01) |
| *F03B 15/00* | (2006.01) |

(52) U.S. Cl.
CPC .............. *F03B 17/061* (2013.01); *F03B 3/12* (2013.01); *F03B 13/00* (2013.01); *F03B 15/00* (2013.01)

(58) Field of Classification Search
CPC ........... F03B 17/061; F03B 3/04; F03B 13/10
See application file for complete search history.

(56) References Cited

U.S. PATENT DOCUMENTS

| 2,501,696 A | * | 3/1950 | Souczek | ............... F03B 17/061 416/85 |
| 9,303,619 B2 | | 4/2016 | Antonucci et al. | |
| 9,816,479 B2 | * | 11/2017 | Handa | ................... F03B 17/061 |
| 10,526,056 B1 | | 1/2020 | Hakki et al. | |
| 10,710,689 B1 | * | 7/2020 | Young | ..................... B63B 35/44 |

(Continued)

FOREIGN PATENT DOCUMENTS

| EP | 1878912 B1 | 12/2011 |
| WO | 2023034257 A1 | 3/2023 |
| WO | 2023057971 A1 | 4/2023 |

OTHER PUBLICATIONS

Korane, Ken, Hydraulics with a twist: Swivel connections remove stress from hose routing, Sep. 3, 2019, hoseassemblytips.com (Year: 2019).*

(Continued)

*Primary Examiner* — Eldon T Brockman
(74) *Attorney, Agent, or Firm* — Leber IP Law; Celia H. Leber

(57) ABSTRACT

A hydrokinetic turbine systems are disclosed. Such systems may include (a) a submersible rotor assembly comprising a housing, the housing defining a chamber and at least one opening configured to allow water to flow in and out of the chamber, a buoyancy mechanism disposed in the chamber, and one or more vanes extending from the housing; (b) a generator; and (c) a shaft, operably coupled to the rotor assembly and the generator to transmit rotational force from the rotor assembly to the generator. Rotor assemblies for use in these systems and methods of using the systems are also disclosed.

16 Claims, 12 Drawing Sheets

(56) References Cited

U.S. PATENT DOCUMENTS

| | | | |
|---|---|---|---|
| 11,174,829 B2 | 11/2021 | Schurtenberger | |
| 2009/0167022 A1 | 7/2009 | Costin | |
| 2009/0230686 A1* | 9/2009 | Catlin | F03B 13/264 |
| | | | 290/54 |
| 2013/0277980 A1 | 10/2013 | Kiyose et al. | |
| 2016/0017859 A1* | 1/2016 | Handa | F03B 17/061 |
| | | | 60/496 |
| 2018/0266444 A1* | 9/2018 | Futahashi | F03B 17/061 |
| 2018/0306164 A1* | 10/2018 | Lehmann | F03B 13/187 |

OTHER PUBLICATIONS

International Application No. PCT/US2024/059546, International Search Report and Written Opinion mailed Mar. 19, 2025, 12 pages.

* cited by examiner

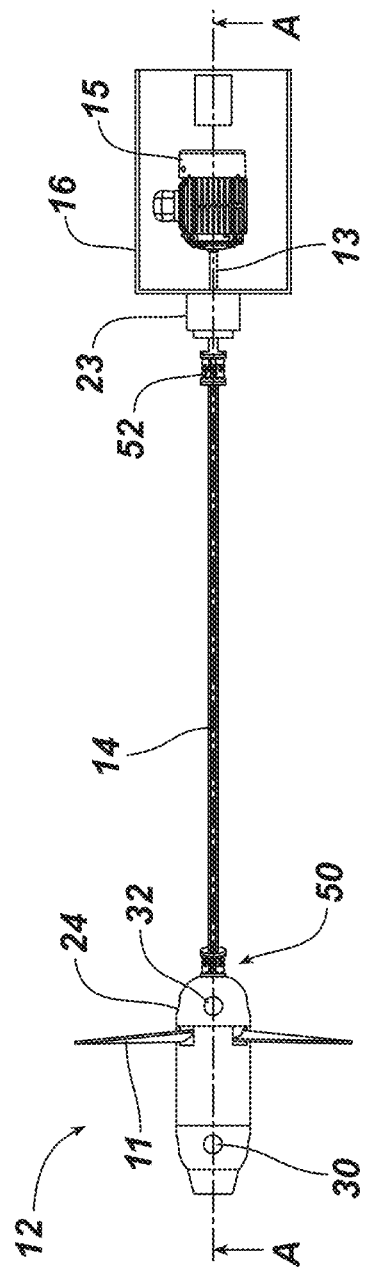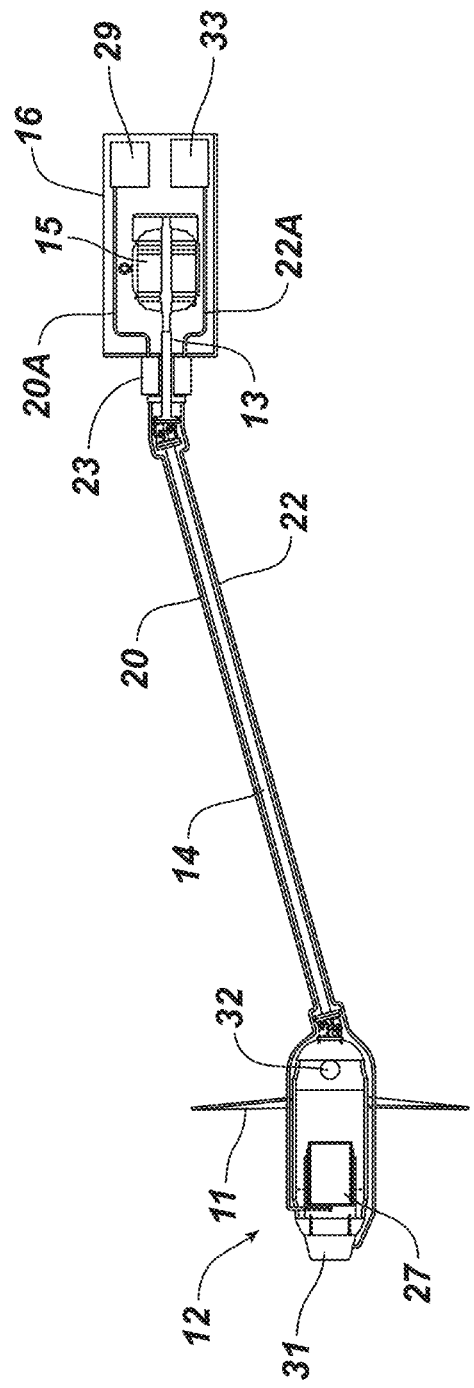
FIG. 3
FIG. 3A

BUOYANCY CONTROL OF TURBOMACHINERY

RELATED APPLICATIONS

This application claims priority from U.S. Provisional Patent Application No. 63/556,142 filed Feb. 21, 2024, the entire disclosure of which is incorporated herein by reference.

STATEMENT REGARDING FEDERALLY SPONSORED RESEARCH OR DEVELOPMENT

This invention was made with government support under Award No. DE-AR0001444 awarded by the U.S. Department of Energy. The government has certain rights in the invention.

BACKGROUND

Hydrokinetic energy is a form of renewable energy that harnesses the power of moving water to generate electricity. Unlike traditional hydropower, which relies on dams and other large infrastructure projects, hydrokinetic energy can be generated with small, decentralized systems that can be deployed in a wide range of environments.

One manner of harnessing hydrokinetic energy is the use of hydrokinetic turbines in moving bodies of water. These turbines transmit power from a submerged rotor assembly, having a rotor which rotates in response to flow of the water, along a shaft, which may be flexible or rigid, to an electromechanical device, for example a generator, pump, hysteresis brake, or the like.

To maximize power generation, ideally the depth and pitch of the rotor assembly would remain relatively constant such that the rotor assembly would remain at a desired position in the water most of the time. Understood methods for rotor deployment can theoretically provide these ideal conditions. However, in practice rigid bottom-mounted solutions are subject to water level changes impacting their depth position relative to the location of fastest water velocity, while rigid floating-mounts are exposed and subject to water surface interactions (e.g., waves, wind, debris accumulation) that can impact the rotor pitch.

It is also desirable that the rotor assembly be allowed to move vertically in the water if necessary to avoid or free itself from debris in the water, such as vegetation or other floating or submerged detritus. This freedom of movement is prevented when hydrokinetic turbines are held in the desired position using rigid, fixed mounts in order to maintain a desired vertical positioning.

SUMMARY

The present disclosure features hydrokinetic turbine systems that include a rotor assembly having adjustable buoyancy and methods of using such systems in the generation of energy.

In one aspect, the disclosure features a hydrokinetic turbine system comprising: (a) a submersible rotor assembly comprising a housing, the housing defining a chamber and at least one opening configured to allow water to flow in and out of the chamber, a buoyancy mechanism disposed in the chamber, and one or more vanes extending from the housing; (b) a generator; and (c) a shaft, operably coupled to the rotor assembly and the generator to transmit rotational force from the rotor assembly to the generator.

Some implementations include one or more of the following features.

The buoyancy mechanism may be pneumatically actuated. For example, the buoyancy mechanism may include an expandable element, e.g., a piston or bellows, that is configured to move between a collapsed position and an expanded position in response to delivery of air to the element, and which displaces water from the chamber as it is moved to the expanded position. The buoyancy mechanism may be configured so that the expandable element is moved from the expanded position to the collapsed position by applying a vacuum to the element. The system may further comprise a pneumatic supply line in communication with the buoyancy mechanism.

The system may further include a pneumatic rotary union configured to transmit air from a stationary compressor to the rotor assembly via the pneumatic supply line.

The system may further include one or more sensors configured to measure data indicative of depth of the rotor assembly in a body of water.

The system may further include an electrical line configured to provide communication between the sensor(s) and a controller configured to actuate the buoyancy mechanism in response to changes in the depth of the rotor assembly.

In another aspect, the invention features a rotor assembly for use in a hydrokinetic turbine system, the rotor assembly comprising a housing, the housing defining a chamber and at least one opening configured to allow water to flow in and out of the chamber; a buoyancy mechanism disposed in the chamber; and one or more vanes extending from the housing.

In some implementations this aspect may include any of the features discussed above.

In a further aspect, the invention features a method of generating power using a hydrokinetic turbine system. The method includes (a) providing a hydrokinetic turbine system comprising: (i) a submersible rotor assembly comprising a housing, the housing defining a chamber and at least one opening configured to allow water to flow in and out of the chamber, a buoyancy mechanism disposed in the chamber, and one or more vanes extending from the housing; (ii) a generator; and (iii) a shaft, operably coupled to the rotor assembly and the generator to transmit rotational force from the rotor assembly to the generator; (b) submersing the rotor assembly in a body of water; and (c) utilizing the buoyancy mechanism to adjust the depth of the rotor assembly in the body of water.

Some implementations of the method may include one or more of the following features. Utilizing the buoyancy mechanism may comprise delivering air to the buoyancy mechanism to decrease the depth of the rotor assembly in the body of water. Utilizing the buoyancy mechanism may further comprise removing air from the buoyancy mechanism to increase the depth of the rotor assembly in the body of water.

The method may also include measuring the depth of the rotor assembly in the body of water.

The method may also include using a controller to automatically actuate the buoyancy mechanism to adjust the depth of the rotor assembly in response to data obtained by measuring the depth.

The method may also include supplying electricity to the rotor assembly to power one or more sensors disposed in the rotor assembly.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

DESCRIPTION OF THE DRAWINGS

FIG. 3 is a top view of the hydrokinetic turbine system of FIG. 2.

FIG. 3A is a cross-sectional view of the hydrokinetic turbine system taken along line A-A in FIG. 3.

DETAILED DESCRIPTION

Figure 1:
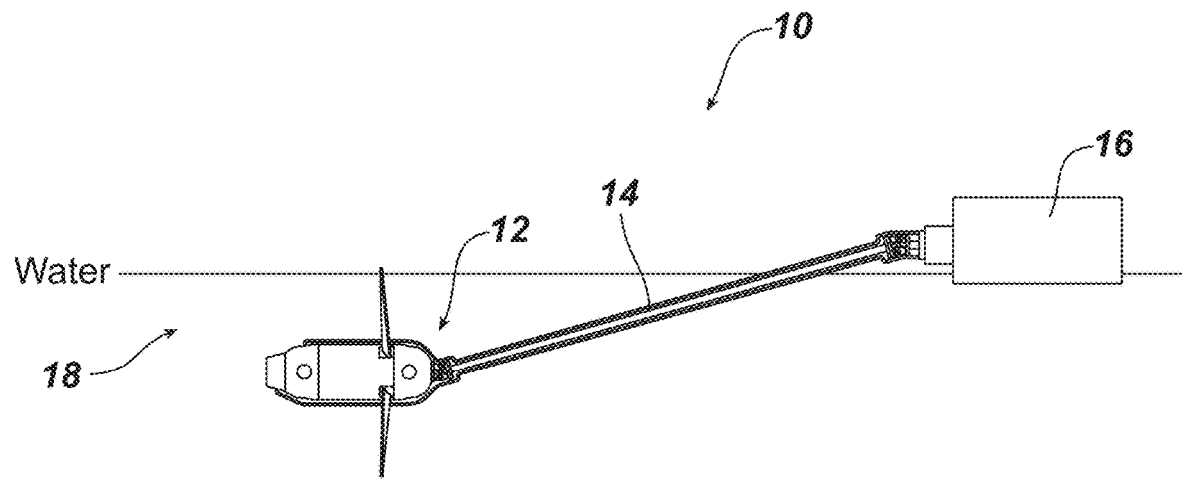
FIG. 1 is a diagrammatic view showing a hydrokinetic turbine system with a rotor assembly shown in a first vertical position in a body of water.
Figure 1A:
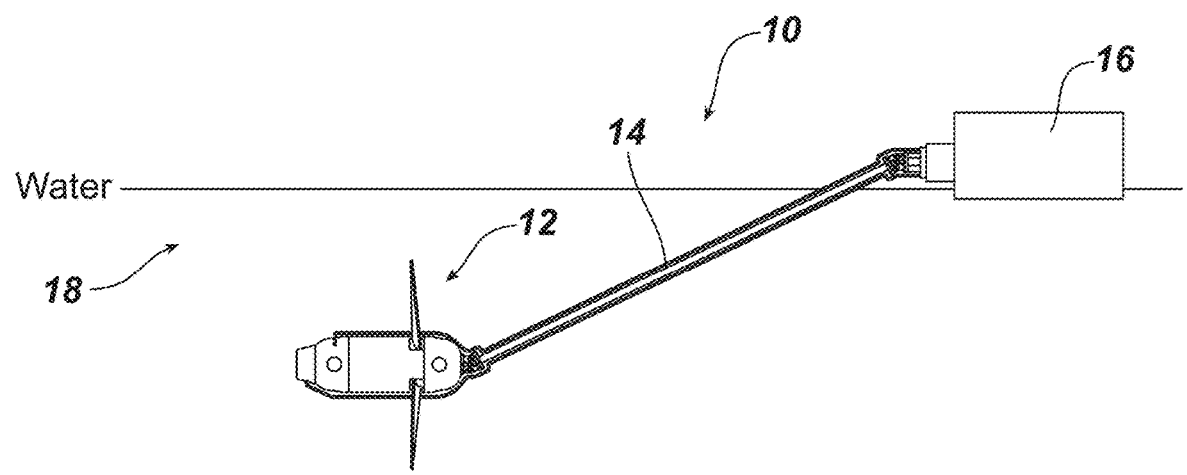
FIG. 1A is a diagrammatic view showing the hydrokinetic turbine system of FIG. 1 with the rotor assembly in a second vertical position, deeper in the body of water.
Figure 8:
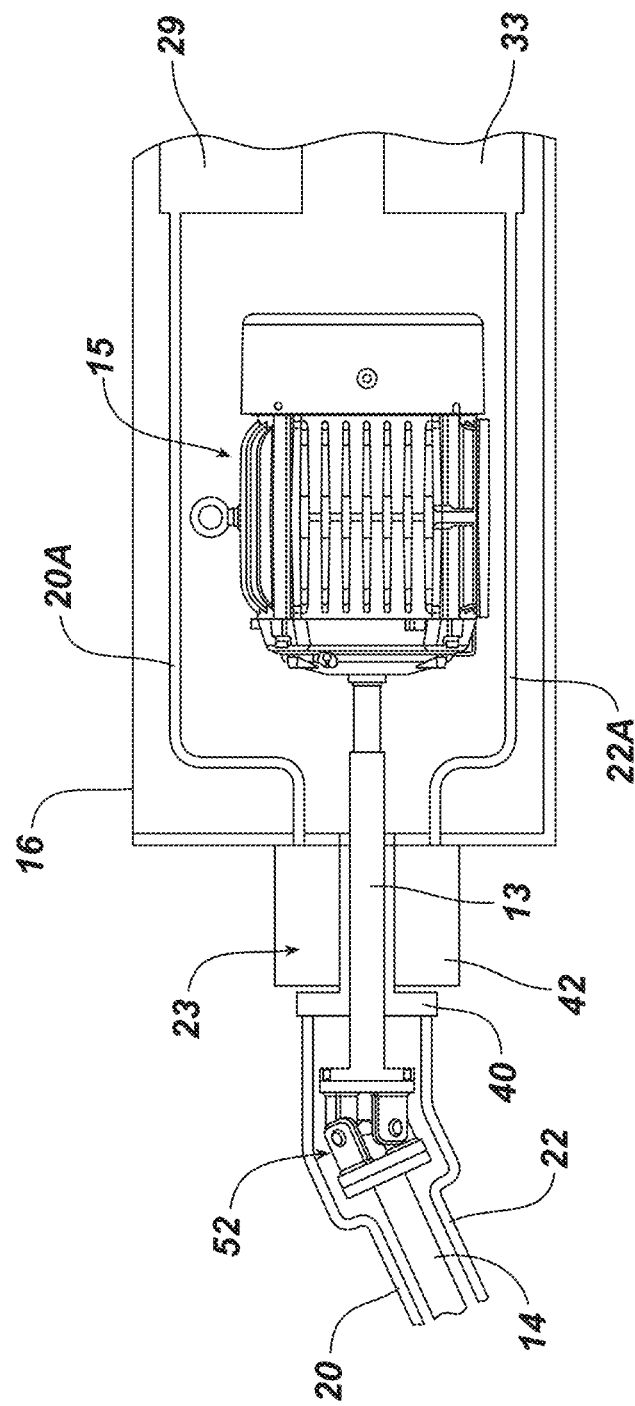
FIG. 8 is a cross-sectional view of the generator housing and joint of the hydrokinetic turbine system shown in FIG. 2.

FIGS. 1 and 1A show a hydrokinetic turbine system 10 that includes a rotor assembly 12 mounted on a power shaft 14 that operably connects the rotor assembly to a generator 15 (FIG. 8) within a generator housing 16. Rotation of the rotor assembly 12 in response to water flow past the vanes 11 is transmitted to a shaft 13 of the generator 15 by the rotating shaft 14 to generate power as is well known.

The rotor assembly 12 is submersed in a body of water 18, while the generator housing 16 is positioned such that it is at least partially above the surface of the water. The generator housing may, for example, be afloat, mounted above or at the water line, for example on a mooring, or partially or fully submerged. In FIG. 1 the rotor assembly is at a relatively shallow vertical position, while in FIG. 1A the rotor assembly is positioned deeper in the water. These two different vertical positions are the result of a change in buoyancy of the rotor assembly, i.e., the rotor assembly is more buoyant in the state shown in FIG. 1 than in the state shown in FIG. 1A. The buoyancy has been changed by adjusting the ratio of the volume of air (or other gas) to the volume of water in a buoyancy chamber in the rotor assembly 12, which can be done remotely by an operator or automatically, as will be discussed in detail below. The water acts as ballast and increases the density of the rotor assembly, thus causing the rotor assembly to sink to a lower level in the water.

It is desirable that the rotor assembly be positioned in the water at the depth having the highest water velocity, which will generally remain fairly constant for a given body of water and location but will be different for different bodies of water and/or locations. The system can be programmed to maintain the rotor assembly at a predetermined depth so as to maximize the water velocity to which the rotor assembly is exposed.

Figure 2:
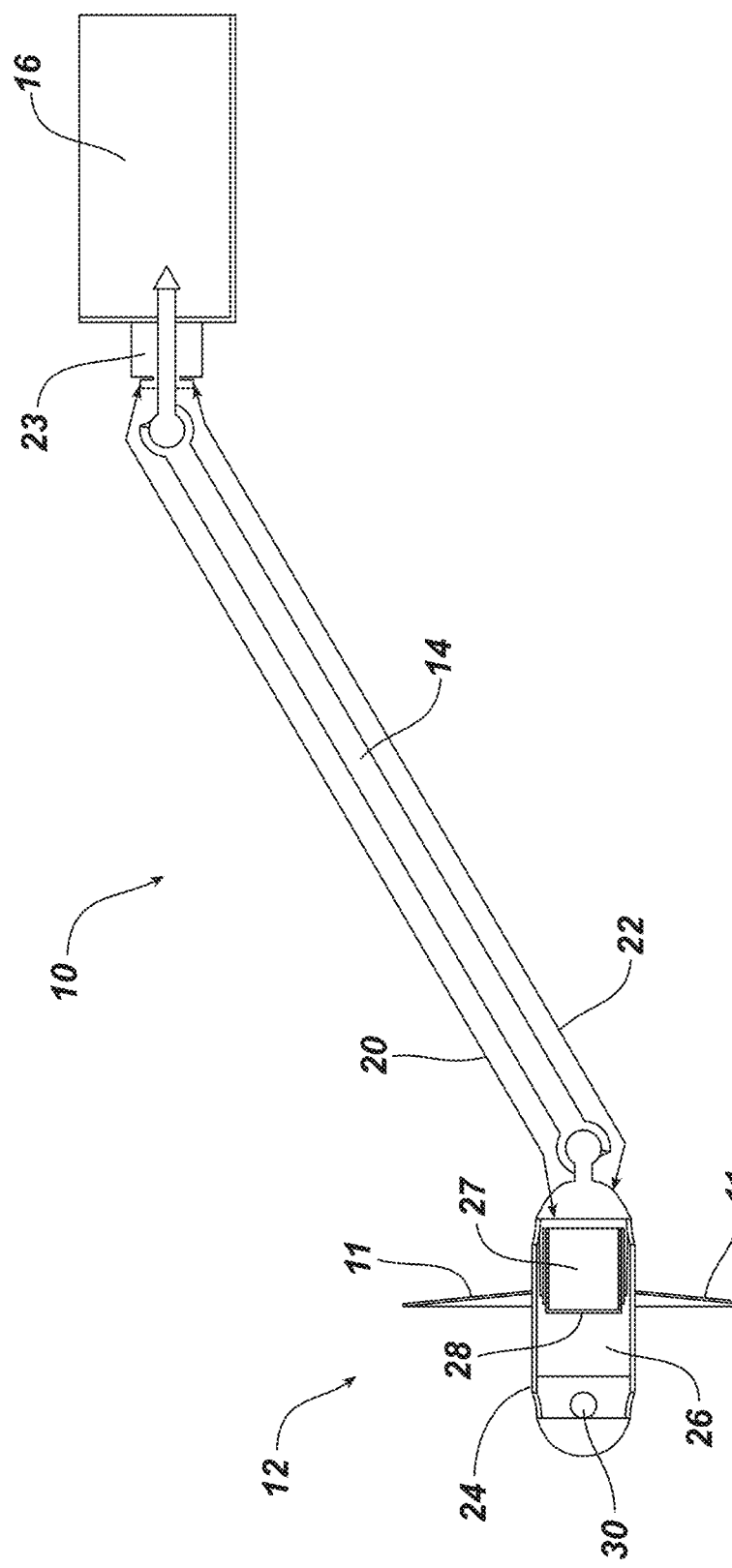
FIG. 2 is a diagrammatic side cross-sectional view of a hydrokinetic turbine system according to one implementation.

As shown in FIG. 2, the rotor assembly 12 includes a housing 24 which defines a floodable chamber 26. A pneumatically actuated buoyancy mechanism 27 is disposed within the chamber 26. Advantageously, because the buoyancy mechanism in this implementation is pneumatically actuated no major electromechanical components are located in the submersed rotor assembly.

Figure 4:
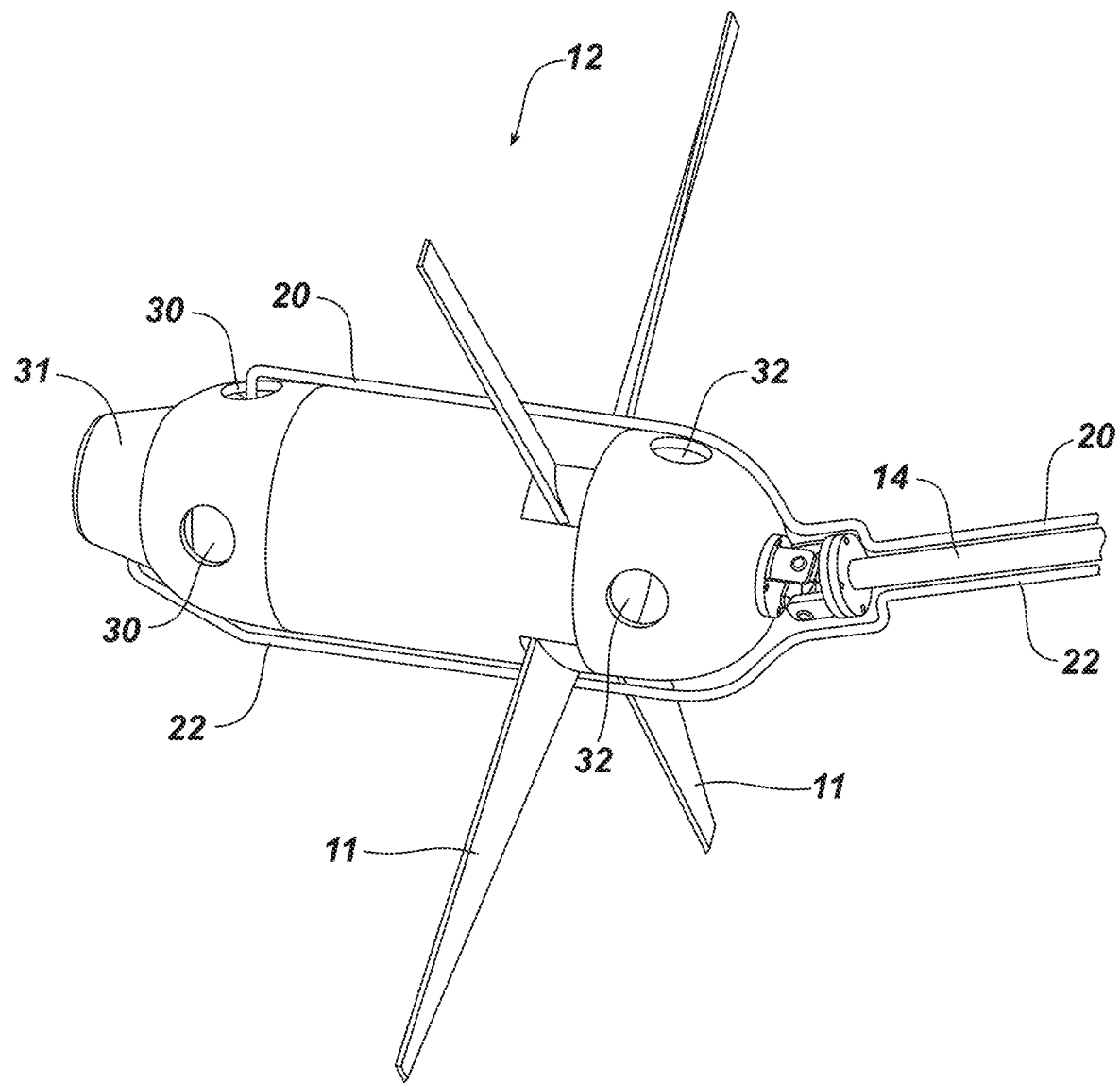
FIG. 4 is a perspective view of a rotor assembly in isolation.
Figure 5:
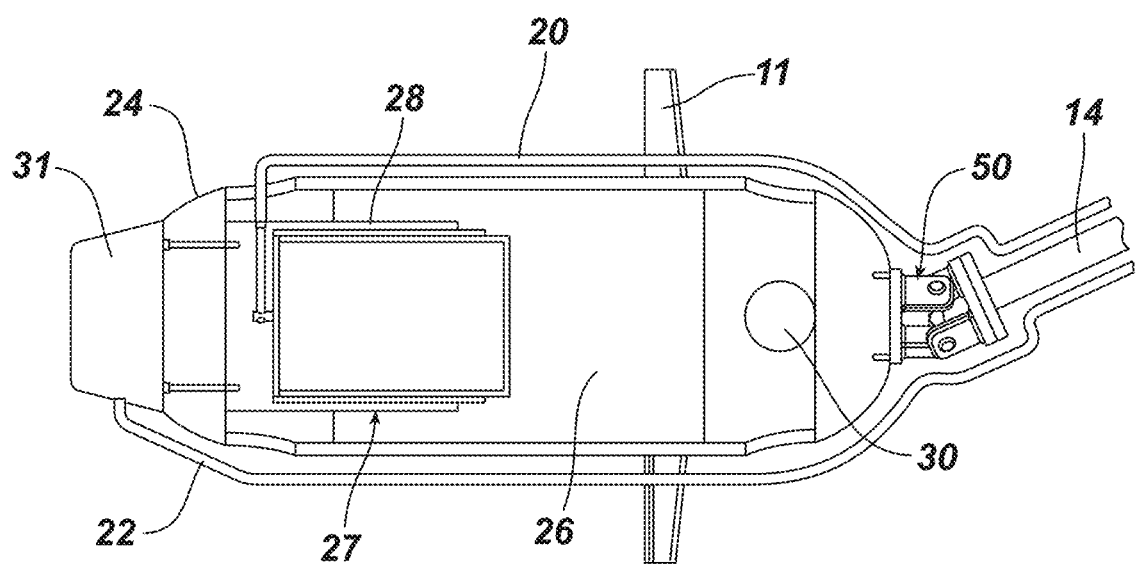
FIG. 5 is a cross-sectional view of the rotor assembly shown in FIG. 4, with the buoyancy mechanism in a compressed state.
Figure 5A:
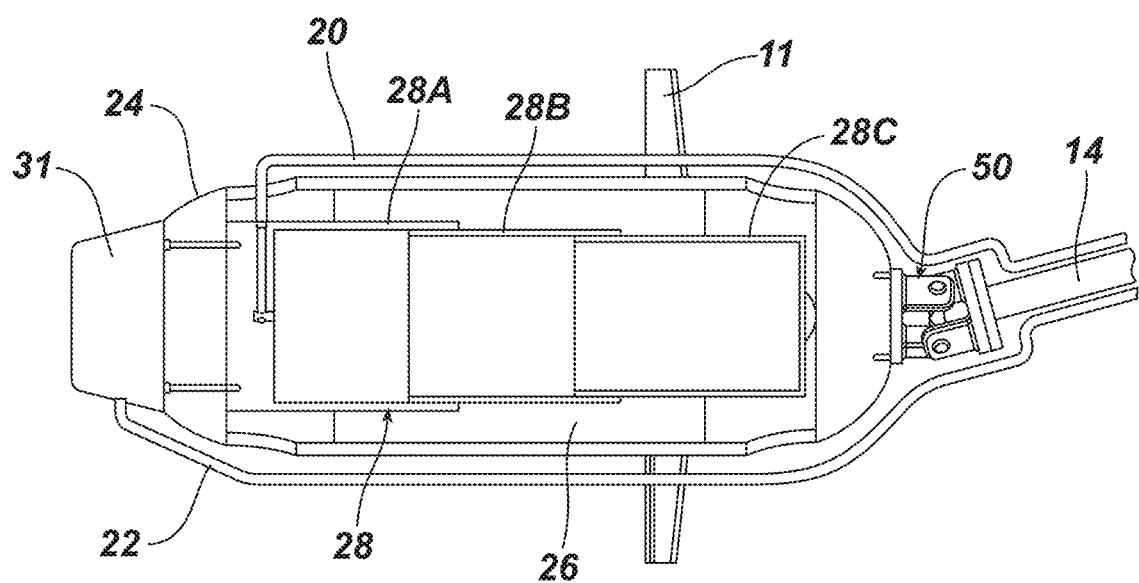
FIG. 5A is similar to FIG. 5 but shows the buoyancy mechanism in an expanded state.
Figure 6:
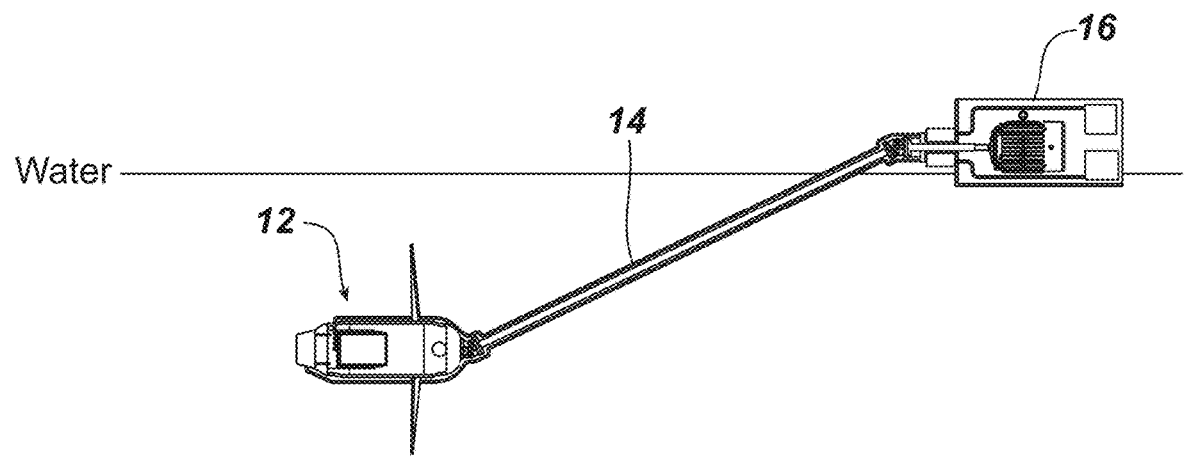
FIG. 6 is a diagrammatic view of a hydrokinetic turbine system in use with the buoyancy mechanism of the rotor assembly in the position shown in FIG. 5.
Figure 6A:
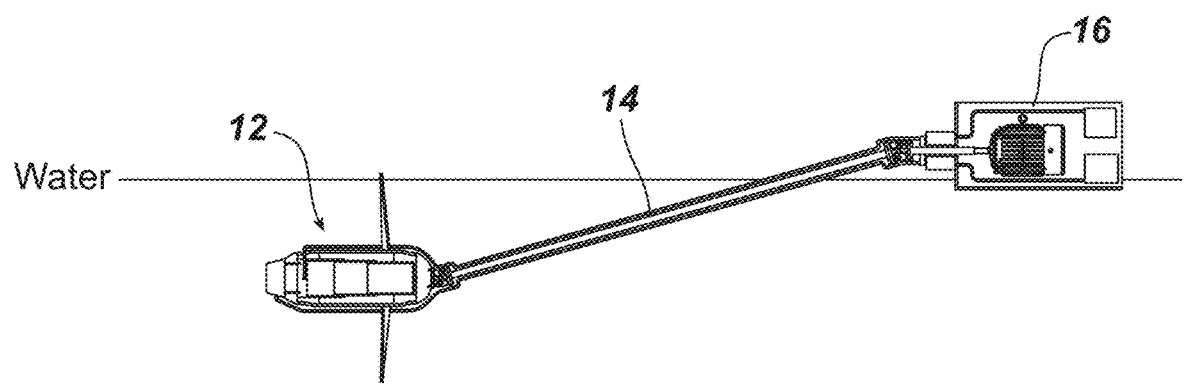
FIG. 6A is a diagrammatic view of a hydrokinetic turbine system in use with the buoyancy mechanism in the position shown in FIG. 5A.

In the implementation shown in FIGS. 2, 3A, 5, 5A, 6 and 6A the buoyancy mechanism 27 is in the form of a telescoping piston 28 that moves between a collapsed position, shown in FIGS. 2, 3A, 5 and 6, and an expanded position, shown in FIGS. 5A and 6A, in response to injection of compressed air (or other gas) into the piston 28. The piston 28 moves back to the collapsed position in response to the air being drawn out by a vacuum or hydrostatic pressure being applied to the piston. The chamber 26 surrounding the piston is flooded with water, such that there is a greater volume of water in the chamber when the piston is in its collapsed position than when it is in its expanded position. When the piston expands, water is forced out of chamber 26 through a plurality of outlet openings 30, best seen in FIG. 4. When the piston collapses, water flows back in, flooding the chamber, through inlet/outlet openings 30.

The compressed air/vacuum (collectively "pneumatics") are supplied to the rotating rotor assembly via pneumatic supply lines 20, shown diagrammatically as a single line in FIG. 2. The pneumatic supply 20 delivers compressed air from a compressor 29 (shown diagrammatically in FIG. 8) to the rotor assembly 12 and draws a vacuum when the compressor is run in reverse.

The pneumatic supply needs to be capable of exceeding the hydrostatic pressure and of supplying enough pressure to expand the piston at the intended depth range. A tank or other pressure vessel can be used to store air if the pump cannot supply the required volume in a reasonable amount of time. The pump can be a combined pressure/vacuum pump, or the pump can be used with a separate vacuum generator.

Referring to FIG. 2, the hydrokinetic turbine 10 also includes an electrical line 22, shown diagrammatically. The electrical line provides electrical communication between various above-water electrical components 33 (shown diagrammatically in FIG. 8), and one or more sensors (discussed below) disposed in a sensor housing 31 (FIG. 4) in the rotor assembly. For example, electricity from a power source may be supplied to the sensors, and/or digital and/or analog signals can be sent from the sensors to a controller and/or a computer or other computing device.

Delivery of pneumatics, electricity, and electrical signals from the stationary components in the generator housing (or elsewhere above the surface of the water) to and from the rotating rotor assembly 12 is accomplished using a hybrid rotary union 23 (FIG. 3), which combines an electrical slip ring and a pneumatic rotary union. As shown diagrammatically in FIG. 8, the hybrid rotary union 23 includes a slip ring rotor 40 and a slip ring stator 42. Hybrid rotary unions are well known in the art and thus will not be discussed in detail. The hybrid rotary union 23 provides communication between lines 20, 22, discussed above, and corresponding lines 20A, 22A that extend between the rotary union and the compressor 29 and electrical components 33, respectively.

Two different types of pneumatically actuated buoyancy mechanisms are shown in FIGS. 5-5A and 7-7A.

FIGS. 5-5A show the buoyancy mechanism discussed above, having a telescoping piston 28, in further detail. As can be seen in FIG. 5A, in this implementation the piston 28 has three sections 28A, 28B, and 28C that expand and collapse in a telescoping manner. In the expanded position the piston 28 takes up much of the volume of the chamber 26, forcing out most of the water that floods the chamber when the piston is in the collapsed position shown in FIG. 5.

Figure 7:
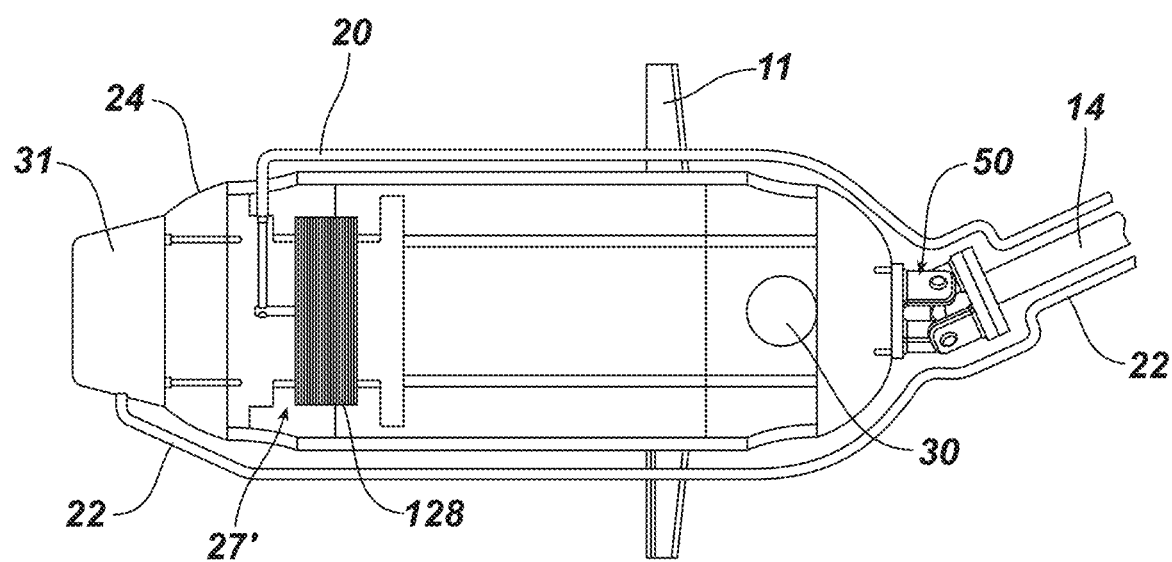
FIG. 7 is an enlarged detail view of a rotor assembly according to an alternate embodiment, with the buoyancy mechanism in a compressed state.
Figure 7A:
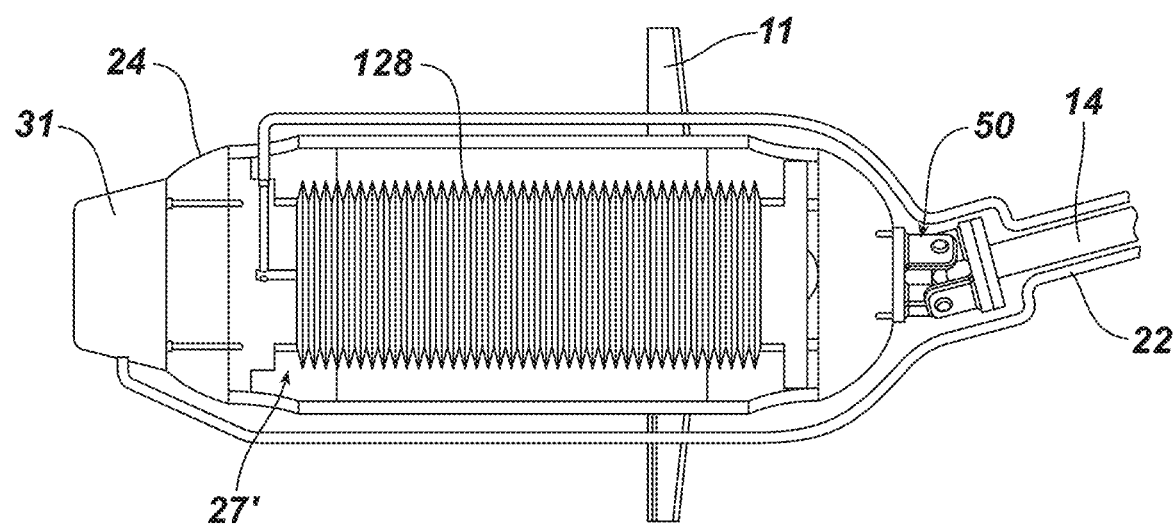
FIG. 7A is similar to FIG. 7 but shows the buoyancy mechanism in an expanded state.

In the alternate implementation shown in FIGS. 7 and 7A the buoyancy mechanism 27 includes a bellows 128 rather than the piston 28. The bellows 128 collapses to a much smaller size than the telescoping piston, as can be seen in FIG. 7, and thus the change in volume of water in the chamber 26 between the two states of the bellows is significantly greater than the change that can be achieved with the piston. The bellows may be any type of airtight bellows, for example a molded or disk bellows. Suitable materials include rubber, silicone, and neoprene.

Various types of sensors may be included in the rotor assembly. It is generally preferred that the rotor assembly include a depth gauge (for example a pressure sensor). However, if desired the depth can be measured indirectly by measuring the angle of the shaft 14 using an angular sensor, which would generally be positioned at the generator housing end of the shaft 14. Other sensors that may be used include an accelerometer, to measure the pitch of the rotor assembly, and a flow meter (e.g., a compressed gas flow meter) to approximate the displaced volume of water to and from the chamber 26.

Data from the sensors is transmitted via lines 22 and 22A to the electronic components 33 (control system) for processing. In some implementations the depth-related data (whether pressure measurements or data from an angular sensor) are transmitted to a controller that can be programmed to automatically adjust the buoyancy of the rotor assembly by actuating the buoyancy mechanism via the pneumatics. Automatic adjustment can be controlled, for example, using a proportional-integral-derivative (PID) controller. In some implementations the adjustment may be made manually by an operator instead of or in addition to automatic adjustment. The adjustments may be made and/or logged using a computer or other computing device.

If an accelerometer is included the rotor assembly may also be configured to allow its pitch (horizontal orientation) to be adjusted. In some implementations this may be accomplished by positioning a weight (not shown) at the free end of the piston or bellows, such that the center of gravity of the rotor assembly changes with expansion and collapsing of the buoyancy mechanism to adjust for the change in center of gravity as the volume of water increases and decreases.

In the implementation shown in FIGS. 1-8, in which the power shaft 14 is substantially rigid, universal joint assemblies 50, 52 are provided at both ends of the shaft 14. Joint assembly 50 connects the shaft 14 to the rotor assembly 12 in a manner to allow the pitch of the rotor assembly to change, while joint assembly 52 connects the power shaft 14 to the generator shaft 13 in a manner that allows the angle of the power shaft with respect to the generator housing to change.

In use, in preferred implementations the system is configured to automatically maintain the rotor assembly at a predetermined depth. The controller is programmed to automatically maintain the predetermined depth which can be manually set during programming. The predetermined depth is generally the depth at which the velocity of the water is expected to be highest. This depth is often as close to the surface as possible in an open river but will depend on the flow characteristics of a given body of water. Thus, the predetermined depth is generally determined empirically. The predetermined depth can also be calculated as a predetermined ratio of water surface clearance to the tip of the blades, i.e. what percentage of the total rotor diameter/radius is desired for clearance. An acoustic doppler current profiler (ADCP) may be used to measure water velocities over a long period of time to characterize the flows in a particular body of water. Optimization functions can also be used to search for the depth with highest velocity in an application where water velocities tend to change.

Figure 9:
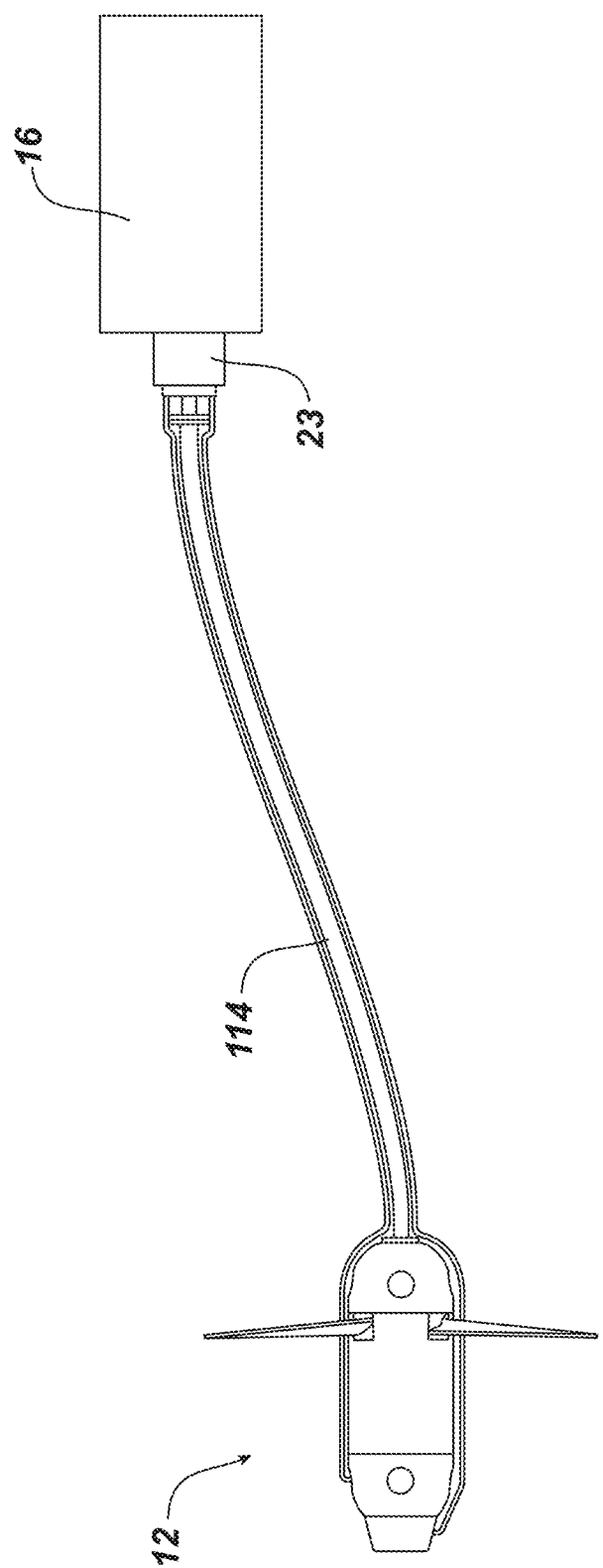
FIG. 9 is a diagrammatic side view of a hydrokinetic turbine according to an implementation in which the shaft is flexible.

While a rigid shaft is shown in the figures discussed above, in some implementations the system may include a flexible shaft, for example as shown in FIG. 9, in which a flexible shaft 114 extends between the generator housing 16 and the rotor assembly 12. A flexible shaft may be utilized, for example, to allow the rotor assembly to move freely if it encounters debris (such as floating trees or branches) and may also make it easier to transport the system if the shaft is configured to be coiled up during transport and storage. In this case, the joints discussed above are not necessary since the flexible shaft allows for freedom of movement at both the generator housing end and the rotor assembly end.

Other Embodiments

A number of embodiments have been described. Nevertheless, it will be understood that various modifications may be made without departing from the spirit and scope of the disclosure.

For example, other types of buoyancy mechanisms may be used. The buoyancy mechanism may be any device that displaces water from the buoyancy chamber, such as an electrically actuated piston rather than the pneumatically actuated mechanisms described above, a hydraulically actuated mechanism using a liquid less dense than water, or a bladder, rather than a piston or bellows.

In the case of an electrically actuated piston, rather than supplying compressed air to the rotor assembly, ambient pressure air can be drawn into the piston and air from the piston can be vented to the surface. Also, the electrical supply lines would be utilized in this case to supply power to the electrically actuated piston.

Various configurations may be used for the pneumatic and electrical supply lines. For example, rather than running outside of the shaft as shown and discussed above, the lines can be run through the shaft 14 (in which case the shaft would be hollow and the rotary union would be located entirely in the generator housing).

While the rotary union is illustrated as being outside the housing in some implementations it may be disposed within the housing to protect the seals and connections of the hybrid rotary union from water.

Figure 10:
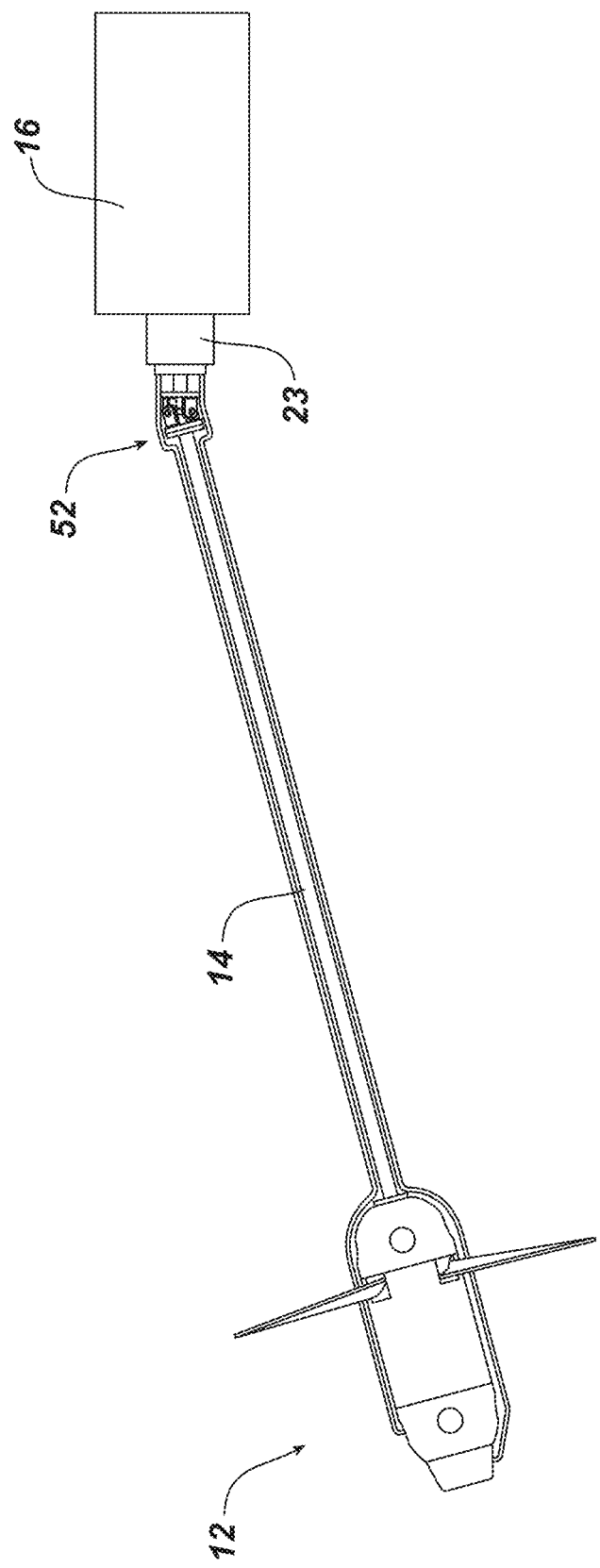
FIG. 10 is a diagrammatic side view of a hydrokinetic turbine according to an implementation in which only a single joint is provided.

Referring to FIG. 10, in some implementations the joint between the rotor assembly 12 and the shaft 14 can be omitted, for example in applications in which there will not be a great deal of pitch variability or where it is not necessary to control the pitch of the rotor assembly.

In some implementations, for example if the depth of the rotor assembly is calculated based on the angle of the shaft, sensors may be omitted from the rotor housing, in which case electrical lines to the rotor housing may not be needed.

Accordingly, other embodiments are within the scope of the following claims.

What is claimed is:

1. A hydrokinetic turbine system comprising:
 a submersible rotor assembly, configured to be submersed below a surface of a body of water, the submersible rotor assembly comprising a housing, the housing defining a chamber and at least one inlet/outlet opening configured to allow water to flow in and out of the chamber, a buoyancy mechanism disposed in the chamber, and one or more vanes extending from the housing;
 a generator disposed in a generator housing, at least a portion of which is positioned above the surface of the body of water;
 a compressor disposed in the generator housing; and
 a shaft, operably coupled to the rotor assembly and the generator to transmit rotational force from the rotor assembly to the generator;
 wherein the buoyancy mechanism includes an expandable element that is configured to expand in a circumferentially constrained manner, in response to delivery of compressed air to the expandable element from the compressor via a pneumatic supply line, so that the expandable element moves linearly between a collapsed position and an expanded position;
 wherein movement of the expandable element to the expanded position forces water from the housing through the one or more inlet/outlet openings in the housing and wherein, when the piston moves to the collapsed position water flows back in through the inlet/outlet openings flooding the chamber.

2. The system of claim 1, wherein the expandable element comprises a piston or bellows.

3. The system of claim 1, further comprising a pneumatic rotary union configured to transmit air from the compressor to the rotor assembly via the pneumatic supply line.

4. The system of claim 1, further comprising one or more sensors configured to measure data indicative of depth of the rotor assembly in a body of water.

5. The system of claim 4, further comprising an electrical line configured to provide communication between the sensor(s) and a controller configured to actuate the buoyancy mechanism in response to changes in the depth of the rotor assembly.

6. A rotor assembly for use in a hydrokinetic turbine system, the rotor assembly comprising:
 a housing, the housing defining a chamber and at least one inlet/outlet opening configured to allow water to flow in and out of the chamber,
 a buoyancy mechanism disposed in the chamber, wherein the buoyancy mechanism includes an expandable element that is configured to expand in a circumferentially constrained manner in response to air delivered from a compressor external to the rotor assembly so that the expandable element moves linearly between a collapsed position and an expanded position, displacing water from the chamber as it moves to the expanded position, and
 one or more vanes extending from the housing,
 wherein movement of the expandable element to the expanded position forces water from the housing through the one or more inlet/outlet openings in the housing and wherein, when the piston moves to the collapsed position water flows back in through the inlet/outlet openings flooding the chamber.

7. The rotor assembly of claim 6, wherein the buoyancy mechanism is pneumatically actuated.

8. The rotor assembly of claim 7, wherein the expandable element is configured to move between a collapsed position and an expanded position in response to delivery of air to the expandable element.

9. The rotor assembly of claim 8, wherein the buoyancy mechanism is configured so that the expandable element is moved from the expanded position to the collapsed position by applying a vacuum to the element.

10. The rotor assembly of claim 8, wherein the expandable element comprises a piston or bellows.

11. A method of generating power using a hydrokinetic turbine system, the method comprising:
 providing a hydrokinetic turbine system comprising: (a) a submersible rotor assembly, configured to be submersed below a surface of a body of water, the submersible rotor assembly comprising a housing, the housing defining a chamber and at least one inlet/outlet opening configured to allow water to flow in and out of the chamber, a buoyancy mechanism disposed in the chamber, and one or more vanes extending from the housing; (b) a generator disposed in a generator housing, at least a portion of which is positioned above the surface of the body of water; (c) a compressor disposed in the generator housing; and (d) a shaft, operably coupled to the rotor assembly and the generator to transmit rotational force from the rotor assembly to the generator;
 submersing the rotor assembly in a body of water; and
 utilizing the buoyancy mechanism to adjust the depth of the rotor assembly in the body of water, wherein the buoyancy mechanism includes an expandable element that is configured to expand in a circumferentially constrained manner, in response to delivery of compressed air to the expandable element from the compressor via a pneumatic supply line, so that the expandable element moves linearly between a collapsed position and an expanded position, wherein movement of the expandable element to the expanded position forces water from the housing through the one or more inlet/outlet openings in the housing and wherein, when the piston moves to the collapsed position water flows back in through the inlet/outlet openings flooding the chamber, and wherein adjusting the depth of the rotor assembly comprises actuating the linear movement of the expandable element.

12. The method of claim 11 wherein utilizing the buoyancy mechanism comprises delivering air to the buoyancy mechanism to decrease the depth of the rotor assembly in the body of water.

13. The method of claim 12 wherein utilizing the buoyancy mechanism further comprises removing air from the buoyancy mechanism to increase the depth of the rotor assembly in the body of water.

14. The method of claim 11 further comprising measuring the depth of the rotor assembly in the body of water.

15. The method of claim 14 further comprising using a controller to automatically actuate the buoyancy mechanism to adjust the depth of the rotor assembly in response to data obtained by measuring the depth.

16. The method of claim 14 further comprising supplying electricity to the rotor assembly to power one or more sensors disposed in the rotor assembly.

* * * * *